Aug. 27, 1957   W. GLAMANN   2,804,063
ENGINE-CONTROLLED BRAKING SYSTEM FOR VEHICLES
PROPELLED BY INTERNAL COMBUSTION ENGINES
Filed Jan. 5, 1954   2 Sheets-Sheet 1
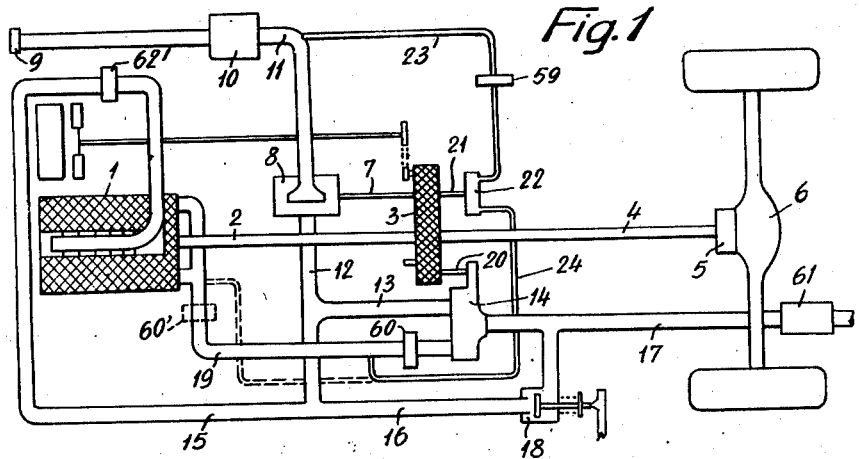
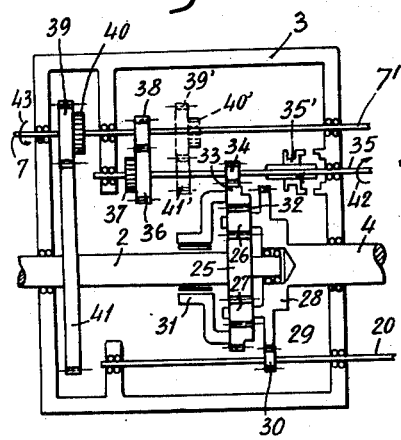
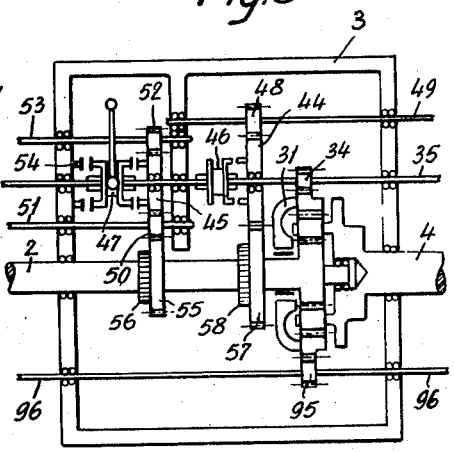
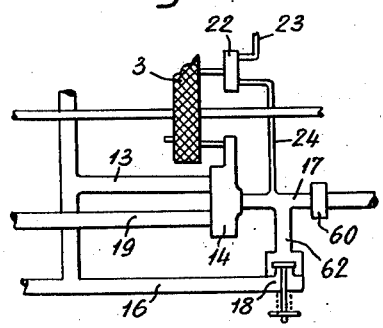
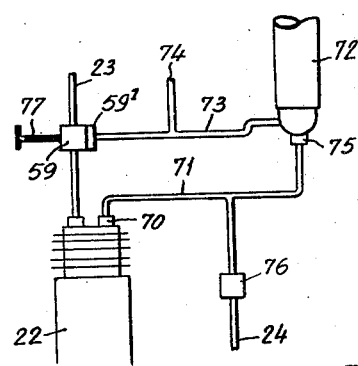
INVENTOR
WILHELM GLAMANN
BY Robert E. Burns
ATTORNEY

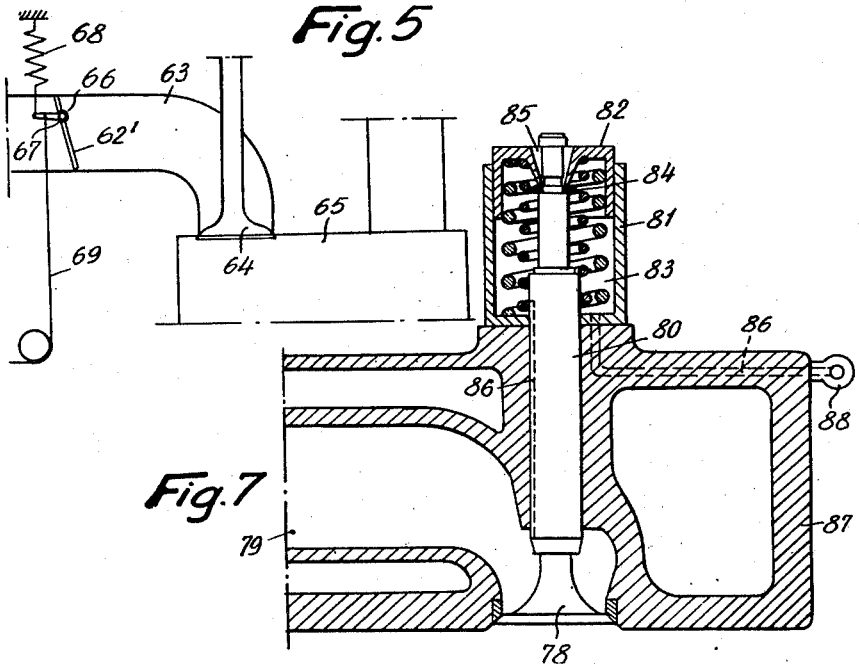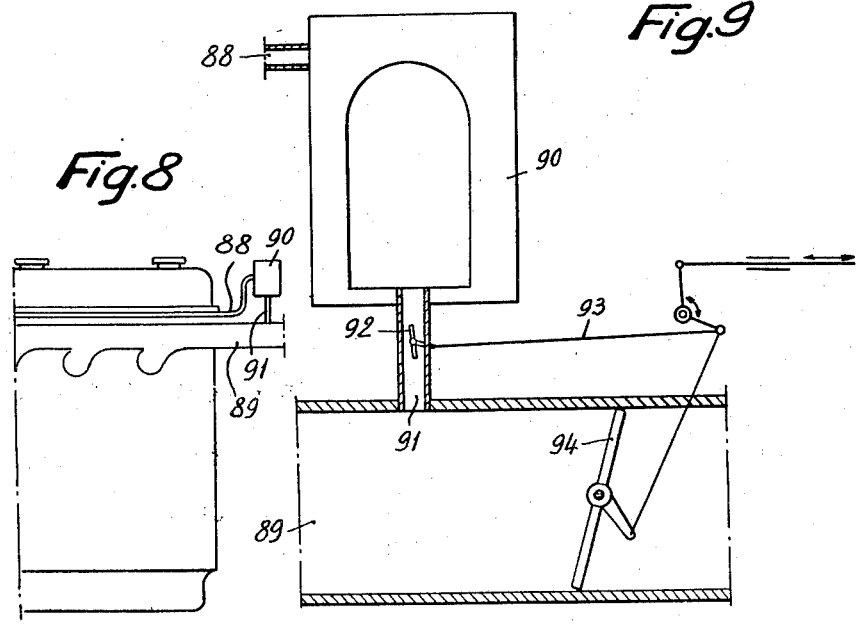

United States Patent Office 2,804,063
Patented Aug. 27, 1957

2,804,063

ENGINE-CONTROLLED BRAKING SYSTEM FOR VEHICLES PROPELLED BY INTERNAL COMBUSTION ENGINES

Wilhelm Glamann, Lyons, France, assignor of one-half to Societe dite: Automobiles M. Berliet, Lyons, France, a corporation of France Application January 5, 1954, Serial No. 402,377

Claims priority, application Germany January 5, 1953

10 Claims. (Cl. 123—97)

My invention has for its object an engine-controlled braking system for vehicles propelled by internal combustion engines and it relates also to improvements in the control of auxiliary means cooperating with such internal combustion engines, chiefly for driving supercharging and braking devices through the engine.

In the French Patent No. 1,051,136, filed on May 24, 1951, by my assignee, Automobiles M. Berliet, an internal combustion engine is described, the power of which is transmitted by a distributing mechanism on one hand to the vehicle wheels and on the other hand to an auxiliary apparatus and more particularly to a supercharger.

The arrangement according to my present invention includes chiefly a distributing mechanism such as an epicycloidal gear the outer ring gear of which drives through the agency of an auxiliary change speed gear various auxiliaries, such as a fan and an oil pump and more particularly supercharging and braking compressors. The control of last mentioned apparatuses is designed in a manner such that said apparatuses are driven selectively by the distributing mechanism or directly by the output shaft of the engine, according as to whether the vehicle is driven by the engine or else by its wheels running under free-wheeling conditions.

The direct drive of the auxiliaries is operative for instance when the distributing mechanism is locked and it is necessary to provide for the rotation of certain auxiliary apparatuses the operation of which is essential for the running of the engine. By inserting unidirectional coupling means in the kinematic chain leading to the auxiliary apparatuses, the latter may be driven so as to revolve always in the same direction, whatever may be the conditions governing the running of the vehicle.

According to another object of my invention, the vehicle is equipped with a circuit of compressed air including a compressor adapted, with a view to braking the vehicle, to feed compressed air into the exhaust pipe of the engine so as to increase the braking torque of the latter when the vehicle is being braked, the output of the compressor being automatically measured by the movements of the brake pedal in a manner such that the intake side is released and the delivery into the atmosphere of the exhaust gases admixed with the air from the compressor is throttled. This circuit is incorporated, furthermore, into the general arrangement of the auxiliaries of the engine so that the suction of air into the engine and into the compressor or compressors is performed through the same silencer, while the exhaust of the engine, of the compressor or compressors and possibly of a turbine driven by the exhaust gases, is also performed through a single silencer.

Further objects of my invention, relating chiefly to the use of the conventional compressor used on board a vehicle for braking through the engine and also relating to arrangements for ensuring fluidtightness in the direction of the intake when the braking pressure is rising inside the exhaust, will appear in the reading of the following detailed description.

The compression for braking purposes in accordance with my invention should be considered as producing a supercharging of the exhaust and it has for its advantage a destruction of energy for braking purposes as provided by an antagonistic compression work generating considerable braking effects in a very gradual and adjustable manner. This compression also cuts out the leaks on the intake side, which leaks constitute one of the drawbacks of the conventional braking as provided through a mere throttling of the exhaust.

According to a preferred embodiment of my invention, a rapid and powerful braking of the vehicle may be obtained by driving the braking compressor which provides for a supercharging of the exhaust through the agency of an epicycloidal gear, as has been described in the case of the supercharger disclosed in the above-mentioned prior French Patent 1,051,136.

This cuts out the risk of an insufficiently rapid braking and of a premature emptying of the compressed air container. As a matter of fact, the control means, operating through the agency of an epicycloidal gear, drive, on one hand, the braking compressor at a rate which is all the higher when the braking of the vehicle is more marked and it provides, on the other hand, when the vehicle is on a declivity, the constancy of the braking power required, independently of the speed assumed by the vehicle.

I will now describe, by way of example and by no means in a limiting sense, various embodiments according to my invention, reference being made to accompanying drawings, wherein:

Fig. 1 is a diagrammatic plan view of the vehicle-driving means;

Fig. 2 illustrates the mechanism distributing the driving power;

Fig. 3 illustrates a different embodiment of the distributing mechanism;

Fig. 4 illustrates a modification of a part of the compressed air circuit;

Fig. 5 illustrates a type of intake pipe which prevents the gasiform fluid from leaking out when the vehicle is being braked;

Fig. 6 shows an arrangement wherein a single compressor provides for the feeding of the compressed air container on board and for the delivery of compressed air for engine braking purposes;

Fig. 7 is a sectional view of an arrangement for reinforcing the action of the exhaust valve;

Fig. 8 illustrates a circuit adapted to submit the arrangement of Fig. 7 to pressure;

Fig. 9 shows details of the circuit illustrated in Fig. 8.

Turning to Fig. 1, the internal combustion engine 1 drives through its shaft 2 a power-distributing mechanism contained inside the casing 3, said mechanism driving in its turn, on one hand, through the shaft 4, the change speed gear 5 and the rear axle 6 and, on the other hand, through the shaft 7, a supercharger 8.

The supercharger 8 sucks in air through the port 9, the filter 10 and the pipe 11. It delivers the compressed air into the pipe 12, said air being then distributed, according to the conditions of running, into the pipe 13 so as to drive a turbine 14, into the pipe 15 for supercharging the engine 1 and into the pipe 16 for exhaust through the pipe 17 after passage of the air through the discharge means 18.

The turbine 14 which is also driven by the exhaust gases passing out of the engine and through the pipe 19, delivers said gases into the above-mentioned exhaust pipe 17 and cooperates further in driving, through the shaft 20, the distributing mechanism contained inside the casing 3. Said mechanism controls, moreover, in the embodiment which is being described, a shaft 21 driving the braking compressor 22 which is fed with air through the pipe 23 opening into the pipe 11, the compressed air produced by the compressor being delivered into the pipe 24 opening into the exhaust pipe 19.

The power distributing mechanism is shown, with further detail, in Fig. 2. The transmission shaft 2 controlled by the engine terminates inside the casing 3 and carries at its end inside said casing the inner sunwheel 25 of an epicycloidal gear. The planet pinions 26 and 27 meshing with said sunwheel revolve over a planet carrier 28 rigid with the transmission shaft 4 leading to the wheels. Said carrier 28 is provided also on its outer surface with a series of teeth 29 meshing with a pinion 30 rigid with the shaft 20 controlled in its turn by the turbine 14.

A ring gear 31 is freely revoluble on the transmission shaft 2, and the teeth 32 formed on its inner surface mesh with the planet pinions 26 and 27 while the outer series of teeth 33 on said ring gear 31 mesh with the gearwheel 34 rigid with the intermediate shaft 35. The latter carries also a gearwheel 36 rigid with a freewheel illustrated diagrammatically at 37, said gearwheel 36 meshing with a gearwheel 38 rigid with the shaft 7. The latter carries also a pinion 39 rigid with a free-wheel 40 and meshing with a large gear-wheel 41 rigid with the transmission shaft 2.

The mechanism executed in accordance with my invention has for its object to make the auxiliary apparatuses revolve in a same direction both when the drive is transmitted to the distributing mechanism through the shaft 2, i. e. by the engine, and when the shaft 4 forms the driving means, i. e. when, for instance, the vehicle is freewheeling while the engine is idling.

Lastly, the auxiliaries are driven directly by the shaft 2 whenever the distributing mechanism is locked, as provided for instance by engagement of the locking clutch 35' on the intermediate shaft 35.

To this end, the mechanism operated in the following manner: the transmission shaft 2 being assumed to drive the distributing mechanism, the intermediate shaft 35 will revolve for instance, in the direction illustrated by the arrow 42. The free-wheel 37 locks then the gearwheel 36 onto the intermediate shaft so that the shaft 7 driving the compressor revolves in the direction of the arrow 43. The transmission ratio in the distributing mechanism is such that the pinion 39 driven by the large gear-wheel 41 revolves at a lower speed than the cooperating free-wheel 40 and the shaft 7 carrying the latter.

In contradistinction, when the action of the transmission shaft 4 predominates, in the drive of the epicycloidal gear, the shaft 35 revolves in a direction opposed to that of the arrow 42 and the unidirectional coupling of the free-wheel 37 provides no longer for a drive of the gearwheel 36. On the other hand, the pinion 39 drives through the associated free-wheel 40 the shaft 7 in the direction of the arrow 43. The same result is obtained when the intermediate shaft 35 is locked through operation of the locking clutch 35'.

A different embodiment of the distributing mechanism is illustrated in Fig. 3. The shaft 2 driven by the engine controls as described above the transmission shaft 4 leading to the rear axle, through the agency of an epicycloidal gear while the outer ring gear 31 of said gear meshes with a gear-wheel 34 rigid with the intermediate shaft 35. In this embodiment, two gear-wheels 44 and 45 are mounted loose on the shaft 35 and are associated with two clutches 46 and 47 of the dog-clutch type, as illustrated in the case of the clutch 46, or of the friction type, as illustrated in the case of the clutch 47. The gear-wheel 44 meshes with a gear-wheel 48 rigid with a shaft 49 controlling an auxiliary apparatus while the gearwheel 45 meshes, on one hand, with the gear-wheel 50 on the shaft 51 controlling the supercharger and, on the other hand, with the gear-wheel 52 on the shaft 53 controlling a third auxiliary apparatus. The clutch 46 illustrated in its inoperative position is adapted to drive the gearwheel 44 when it is shifted towards the right hand side of the mechanism as illustrated, while the clutch 47, also illustrated in its neutral position, is likewise adapted to carry along with it in its rotation the gear-wheel 45 when it is shifted towards the right hand side of Fig. 3, or again, said clutch 47 may serve for holding fast the intermediate shaft 35 through cooperation with a friction lining 54 rigid with the casing. The shaft 2 also carries a gear wheel 55 mounted on the freewheel 56 and a gear-wheel 57 mounted on the freewheel 58. The gear-wheels 55 and 57 are adapted to cooperate respectively with the gear-wheel 50 on the shaft 51 and with the gear-wheel 44 on the shaft 35 respectively.

The operation of the mechanism is as follows:

As long as the vehicle-driving engine forms the actual driving means for the vehicle, the shaft 49 is controlled through the ring gear 31, the pinion 34, the intermediate shaft 35, the clutch 46, the gear-wheel 44 and the pinion 48 on the shaft 49, while the shafts 51 and 53 are driven through the same ring gear 31, the pinion 34, the intermediate shaft 35, the clutch 47, the gear-wheel 45 and finally the pinions 50 and 52 respectively. The gear-wheels 55 and 57 revolve during this time freely round the shaft 2. If, in contradistinction, the epicycloidal gear is driven chiefly by the shaft 4 and the wheels of the vehicle, while the clutches 46 and 47 are inoperative, or again, if the intermediate shaft 35 is held fast by a shifting towards the left of the clutch 47, the auxiliary apparatuses are driven, on one hand, by the gear-wheels 57, 44 and 48, and, on the other hand, by the gear-wheels 55, 50, 45 and 52.

In this embodiment, and also in that disclosed with reference to Fig. 2, the ring gear 31 of the epicycloidal gear may revolve freely in a direction opposed to that of its normal rotation, as long as the intermediate shaft 35 is not held fast purposely, without the rotation of the auxiliary apparatuses being reversed thereby. The vehicle remains unbraked by the engine under such conditions, while it is running freely, and this control of the vehicle is consequently equivalent to an arrangement including a free-wheel fitted at the outer end of the rear axle. The advantage of the arrangement described resides in the fact that, in the embodiment according to my invention, only the torque driving the auxiliary apparatuses is transmitted through the unidirectional driving means, whereas a freewheel arrangement inserted in the vehicle-controlling transmission would assume a larger size since it would have to transmit the total driving torque.

In accordance with my invention, the changes of speed in the synchronized change speed gear 5 (Fig. 1), may be executed without any disengagement of the main clutch (not shown) of the engine by reason of the fact that the output shaft 4 is relieved as soon as the accelerator has been released.

The advantages of an economical running of the vehicle under free-wheeling conditions leads, however, to the drawback of an absence of braking by the engine in declivities and when the vehicle is running on its inertia. According to my invention, I restore a certain amount of braking by locking the intermediate shaft 35 (Figs. 2 and 3) as provided by the engagement of dog-clutches such as 35' (Fig. 2) or of friction clutches such as 47 (Fig. 3) with stationary cooperating parts rigid with the casing enclosing the distributing mechanism.

An efficient braking of the vehicle is obtained in accordance with the invention by means of a further braking compressor.

The braking compressor 22 (Fig. 1) is driven in the embodiment illustrated in Fig. 2, by the output end 7' of the shaft 7. The intermediate shaft 35 carries for this purpose a pinion 41' driving a gear-wheel 39' carried by a free-wheel 40' on the shaft 7. The directions for which the free-wheels 37 and 40' are locked with reference to the direction of rotation of the ring gear 31 of the epicycloidal gear, are opposed. The operation of the arrangement is such that the wheel 40 revolves freely, as long as the driving stress is provided by the shaft 2, while said wheel 40 drives the shaft 7 and the braking compressor when the output shaft 4 provides said driving stress.

The speed of rotation of the shaft 7 is thus modified at the moment of braking as well as the direction of rotation of said shaft. In order to make the gear-wheels 39 and 41 operate as described, it is necessary to substitute for the single shaft 7 two coaxial shafts connected with each other through the free-wheel 40, so that the stub shaft 7 may be independent of the stub shaft 7', when the direction of rotation is reversed.

The braking compressor is driven by the shaft 49, in the case of the embodiment illustrated in Fig. 3. The intermediate wheel 44 is then mounted on a free-wheel or cooperates with releasable driving means, as illustrated in Fig. 3.

The braking compressor may also be driven by the shaft 35 (Fig. 2) which requires, in this case, the cutting out of the unidirectional arrangement such as 40', since the pinion 34 should be rigid with the shaft 35 in order to fulfill all its functions.

The unidirectional rotation may also be obtained by means of a free-wheel housed inside the braking compressor.

An embodiment of the braking circuit has been illustrated in Fig. 1. Inside the intake pipe 23 is housed a throttling member 59 controlled by the brake pedal and controlling the throughput of the braking compressor 22. The latter delivers air into the exhaust pipe 19 ahead of a second throttling member 60.

The delivery pipe 24 of the braking compressor may also, in accordance with a modification of the arrangement disclosed, open directly into the exhaust pipe 17 of the turbine 14, as illustrated in Fig. 4.

The second throttling member 60 is inserted in this case inside said exhaust pipe, but still ahead of the silencer or muffler 61 (Fig. 1) which is common to all the exhaust circuits of the vehicle. When the turbine 14 is provided, in the embodiment illustrated in Fig. 1, with an adjustable stationary blading for the input of the exhaust gases, said blading may, according to the invention, form a substitute for the throttling member 60. In the case of a vehicle which is not provided with a turbine, the pipe 19 is connected directly with the pipe 17.

The operation of the throttling members 59 and 60 (Fig. 1) is such that the exhaust gases cannot enter the suction pipe 11 of the supercharger. As a matter of fact, the exhaust gases enter the braking compressor 22 through the delivery end of the latter, during the normal running periods of the vehicle, and they are stopped by the closed throttling member 59. During the braking periods, the throttling member 59 is gradually opened, while the throttling member 60 which is normally open, is gradually closed.

A certain amount of compressed air used for braking purposes can, in the case illustrated in Fig. 4, escape into the atmosphere through the turbine 14, the pipe 13 and the supercharger. This drawback may be cut out by inserting at the input of the compressed air into the turbine 14, guide blades which allow cutting out the pipe 16 and the exhaust means 18. The guide blades are closed during the braking periods and opened during acceleration. In a different embodiment, the compressor 22 and the discharge means 18 are brought nearer to each other and the pipes 24 and 62 are connected with each other before opening into the exhaust pipe 17.

The supercharger cooperating with the engine, may also act as a braking compressor and the braking action is then controlled by adjusting means similar to those which have just been described. The compressor is, in this case, driven by the single shaft 7 (Fig. 2) passing through the casing containing the distributing mechanism, the drive of the compressor in one case being provided by the gears 36 and 38 and in the other case, by the gears 41' and 39'. The output end 7' of the shaft 7 may drive, e. g. a further supercharger for the engine.

It is necessary to suitably define the supercharging, compressing and braking effects produced by the same compressor or by two separate compressors by a suitable selection of the gear ratios to be provided between the output shaft of the engine and the shaft or shafts of the compressor or compressors. When the cylinder capacity and the volumetric efficiency are equal for supercharging and for braking, the speed reduction for the torque is, according to my invention, preferably three times less during the braking periods than during the supercharging periods. This gear ratio, given by way of a mere exemplification, is obviously modified in relationship with the ratio between the cylinder capacities and the volumetric efficiencies when the latter are not equal.

The means for closing, according to the invention, the engine intake, as illustrated at 62' in Fig. 1, is shown with further detail in Fig. 5. It allows building up pressure inside the exhaust pipes at the beginning of the engine-operated braking stage, so that the braking compressor becomes operative only when the leaks towards the engine intake allow no further increase in pressure.

The intake closing device is constituted by a flap 62' (Fig. 5) located inside the intake pipe 63 opening over the valve 64 into the cylinder 65. Said flap revolves round an eccentric spindle 66 and is controlled by a lever 67. The latter is returned by a spring 68 into its flap-closing position and by a wire pull-rod or the like, 69, towards the flap-opening position.

The flap 62' is open during normal operation of the vehicle. As the pull wire 69 is connected with the brake pedal, it is released when the pedal is depressed, so that the flap has a tendency to close under the action of the spring 68. The flap remains, however, open as long as the engine produces a depression inside the suction manifold. As soon as leaks into the atmosphere appear as a consequence of the increase in pressure inside the exhaust manifold, the flap 62' closes under the combined action of the spring 68 and of the pressure prevailing inside the engine.

Fig. 5 shows, for sake of simplicity of the disclosure, a flap 62' controlling a single cylinder. In practice, the flap controls all the cylinders of the engine and is, therefore, fitted inside the suction manifold ahead of the opening into the cylinders. According to a further modification, the flap 62' may serve a further purpose by forming an emergency system adapted to stop the engine. It allows such a stopping of the engine by throttling the admission of air in the case of a failure of the normal means stopping the engine by shutting off the input of fuel.

In a different embodiment of the invention, the compressed air used for braking purposes is delivered by the compressor which normally functions to maintain a constant air pressure inside the compressed air container carried by the vehicle. Such a compressor having thus dual purpose is driven a. g. by the shaft 49 of the distributing mechanism of Fig. 3, the intermediate gear 44 being controlled in accordance with the conditions of running of the vehicle, either directly through the gear-wheel 57 on the shaft 2 or indirectly through the epicycloidal gear and the dog clutch 46 or a free-wheel through which the gear-wheel 44 is made rigid with the intermediate shaft 35.

In the case of compressors operating in both directions of rotation, the drive through the gear-wheel 57 may, if required, be cut out.

Fig. 6 shows an embodiment of my invention wherein th compressed air compressor on board the vehicle acts also as a braking compressor. The compressor 22 (Fig. 6) sucks air from the pipe 23 through a throttling member 59 and delivers the compressed air through the flap valve 70 and the pipe 71 into the container 72 filled with compressed air. The latter communicates through a pipe 73 with a pipe 74 leading towards the arrangements operated by compressed air and with a pneumatic control system 59′ for the throttling member 59 the operation of which is thus controlled automatically in a conventional manner by the modifications in pressure inside the container 72.

The input end of the container 72 is controlled by a safety flap 75 which closes automatically, whenever the maximum pressure inside the container has been reached, so as to prevent any return of air from the container into the pipe 71.

The pipe 71 carries also a branch pipe 24 corresponding to that shown in Fig. 1, a regulating valve controlled by the brake pedal being inserted at 76 inside said branch pipe 24. When the driven depresses the brake pedal, he opens gradually the valve 76 (Fig. 6) and the throttling members 59 and 60 are adjusted as precedingly. However, since in this last disclosed embodiment the throttling member 59 aslo controls the operation of the compressor 22 during the normal running of the vehicle, the brake pedal is caused to action the lever 77 and predominates over the adjusting effect of the pressure prevailing inside the pipe 73.

In such an apparatus adapted to form both the conventional compressor for use on board the vehicle and the braking compressor, it is preferable to compress, as far as possible, only a small volume for braking purposes. In an advantageous embodiment, the opening of the pipe 24 (Fig. 1) into the exhaust pipe and also the adjusting member, are located in the vicinity of the engine, said embodiment being illustrated in dotted lines in Fig. 1, with the throttling member shown diagrammatically at 60′.

The braking compressor may also, in accordance with a different embodiment, form a centrifugal air brake devoid of any guiding blades at its inlet or output end and provided with laterally guided braking plates.

Whenever, in one of the above described embodiments, it is desired to drive the braking compressor only when the brakes are to be applied, it is sufficient to connect the dog clutch 46 (Fig. 3) with control means operating same at the moment of said application of the brakes, so as to engage then one of its teeth with the teeth of the gear wheel 44 mounted loose on the intermediate shaft 35. The gear wheel 44 drives then the gear wheel 48 rigid with the shaft 49 controlling the compressor.

The tappings of power for driving the auxiliary apparatuses the control of which by the distributing mechanism is of interest, may be arranged on the casing containing said mechanism in different manners. Instead of tapping power for instance through the intermediate shaft 35 (Fig. 3) connected with the auxiliary shafts 51, 53 and 49, further and independent tappings may be provided on shafts driven directly by the outer sunwheel of the epicycloidal gear. Thus, the pinion 95 and the shaft 96 (Fig. 3) may serve for controlling axiliary apparatuses.

An arrangement according to my invention, which has for its object to increase the stress with which the exhaust valves are applied on their seats, is shown in Fig. 7. It allows the valve 71 to resist the pressure prevailing at the moment of the braking inside the exhaust manifold 79.

To this end, the valve guide 80 is surrounded on its upper section by a socket 81 which may or may not be rigid with the guide. The cap 82 enclosing the end of the valve spring assumes also the shape of a socket and slides after the manner of a piston in a substantially fluidtight manner inside the socket 81. The fluidtightness of the chamber 83 enclosing the spring inside the two sockets 81 and 82, is enhanced by the elastic ring 84 made of synthetic rubber for instance, and located in register with the opening provided for the passage of the valve stem through the frustoconical central section of the socket 2.

The exhaust manifold 79 being connected with the chamber 83 through a groove 86 formed inside the valve stem or inside the valve guide, the action of the valve spring is reinforced during the braking periods by the increase in the pressure prevailing inside the chamber 83.

Fig. 7 also shows in dotted lines a further embodiment according to which the chamber 83 communicates with the exhaust manifold by a bore 86′ formed in the cylinder head 87 and opening into a pipe 88 connected, as illustrated in Fig. 8, with the exhaust manifold 89 through a filter 90.

This latter embodiment shows in particular the advantage of preventing any soot or the like from entering the chamber 83, the soot or the like substance being held back by the filter constituted e. g. by a filtering bag.

A further precaution against the entrance of soot inside the chamber 83 consists, in accordance with the invention, in providing inside the pipe 91 connecting the exhaust manifold 89 with the filter 90, a flap 92 as shown in Fig. 9. Said flap is controlled by a link system 93 in association with the main flap 94 closing the exhaust, the two flaps occupying always opposed positions, the flap 92 closing during normal operation of the vehicle and opening only during the braking periods.

I claim:

1. A braking device for internal combustion engine vehicles, adapted in case of over-run to use the engine as a source of auxiliary braking force, said device comprising an engine-driven distributing mechanism including an epicyclic gear actuating a number of output shafts operatively connected to auxiliary apparatus including a compressor adapted, upon a brake application, to deliver compressed air into the engine exhaust pipe at a point situated before a throttling device, for increasing the braking force of the engine, and means for controlling automatically said compressor and its output upon depression of the brake pedal of the vehicle.

2. A braking device for internal combustion engine vehicles, adapted in case of over-run to use the engine as a source of auxiliary braking force, said device comprising an engine-driven distributing mechanism including an epicyclic gear actuating a number of output shafts, transmission means for operatively connecting said output shafts to auxiliary apparatus including a compressor for supercharging said engine and a braking compressor, said transmission means being so designed that the reduction ratio controlling said braking compressor will be lower than that controlling said supercharger when both ratios have been reduced to a same dimension and to a same volumetric efficiency of the compressor.

3. A braking device according to claim 2, wherein the braking compressor is also used for supplying the storage cylinder of the compressed-air system of the vehicle, the arrangement comprising, in addition, a throttling device adapted to regulate the output of said braking compressor and actuated upon a brake application, said throttling device being also responsive to variations in the pressure in said storage cylinder.

4. A braking device according to claim 3, wherein means are provided for regulating the output of said braking compressor by adequately throttling the suction and delivery sides of said braking compressor.

5. A braking device according to claim 3, wherein said throttling devices are controlled by means of the brake pedal of the vehicle.

6. A braking device according to claim 4, wherein means are provided for causing the increase in braking pressure in the exhaust pipes to be effected by the engine and by the braking compressor in succession, and wherein a non-return valve actuated by the brake pedal of the vehicle is provided in the inlet pipe of the engine for preventing any leakage toward the inlet.

7. A braking device according to claim 5, wherein each exhaust valve of the engine is provided with a device having a chamber of variable inner volume, the movable wall of which is fast with the exhaust valve concerned, said chamber communicating with the exhaust pipe of the engine, for reinforcing the closing of the exhaust valves by means of the pressure thus developed in said device.

8. A braking device according to claim 7, wherein a butterfly controlled by the brake pedal is provided whereby said device and the engine exhaust pipe communicate with each other only during a brake application, and a filter for retaining any solid particles contained in the exhaust gases.

9. A braking device for internal combustion engine vehicles as defined in claim 1, wherein each exhaust valve of the engine is provided with a device having a movable wall in a chamber of variable inner volume, said movable wall being secured to the exhaust valve, said device thereby serving to reinforce the closing of the exhaust valves by means of the pressure developed in said device.

10. A braking device for internal combustion engine vehicles as defined in claim 2, wherein each exhaust valve of the engine is provided with a device having a movable wall in a chamber of variable inner volume, said movable wall being secured to the exhaust valve, said device thereby serving to reinforce the closing of the exhaust valves by means of the pressure developed in said device.

References Cited in the file of this patent

UNITED STATES PATENTS

| | | |
|---|---|---|
| 1,519,012 | Shore | Dec. 9, 1924 |
| 1,617,501 | Schwerdtfeger | Feb. 15, 1927 |
| 1,620,100 | Hoxton | Mar. 8, 1927 |
| 2,139,090 | Lysholm et al. | Dec. 6, 1938 |
| 2,505,841 | Shuker et al. | May 2, 1950 |
| 2,587,986 | Fog | Mar. 4, 1952 |